United States Patent [19]

Chen

[11] Patent Number: 5,508,757
[45] Date of Patent: Apr. 16, 1996

[54] FOLDABLE SCREEN PROTECTOR

[75] Inventor: Shu-Ying Chen, Hsien, Taiwan

[73] Assignee: Horng Technical Enterprise Co., Ltd., Tainan Hsien, Taiwan

[21] Appl. No.: 323,741

[22] Filed: Oct. 17, 1994

[51] Int. Cl.$^6$ .................................................. H04N 5/65
[52] U.S. Cl. ..................... 348/818; 348/842; 348/819; 348/823; 348/834
[58] Field of Search ........................... 348/818, 819, 348/823, 826, 834, 835, 838, 842; 312/208.1, 208.3, 208.4, 349, 350

[56] References Cited

U.S. PATENT DOCUMENTS

| | | | |
|---|---|---|---|
| 2,759,178 | 8/1956 | Rose | 340/369 |
| 3,329,770 | 7/1967 | Rose | 178/7.9 |

Primary Examiner—Edward L. Coles, Sr.
Assistant Examiner—Tia M. Harris
Attorney, Agent, or Firm—Browdy and Neimark

[57] ABSTRACT

A foldable screen protector for use on a computer monitor of various kinds has a fixing frame, a foldable top cover, and foldable left and right plates, thereof the fixing frame is adapted and secured to the screen of different types of computer monitors even to that of a notebook computer to provide the screen with protections against reflection of sunlight and oversight of others from outside; and by use of protruded tracks intersecting across the surface of the foldable top cover to reduce the amount of friction and a torsion spring, the foldable top cover and the foldable left and right plates can be folded and unfolded easily. When not in use, the foldable top cover can be folded up and lodged to the fixing frame as a protector to the screen.

2 Claims, 4 Drawing Sheets

FOLDABLE SCREEN PROTECTOR

BACKGROUND OF THE INVENTION

The present invention relates to a foldable screen protector, having a fixing frame, a foldable top cover, and foldable left and right plates. The fixing frame can be adapted and secured to the screen of different types of computer monitors even that of a notebook computer, or to the sight-protective screen lense or screen net fastened to a computer, so as to provide the screen with protection against the reflection of sunlight or others' peeping from outside; and with protruded tracks intersecting across the indent body of the foldable top cover to reduce the amount of friction, the foldable top cover and the foldable left and right plates can be folded and unfolded easily. When not in use, the foldable top cover can be folded downwards and locked to the fixing frame as a screen protector.

Computers play an increasingly important role in our daily life as well as in the business world. Due to long exposure to radiation of monitors, health problems have been a concern of people working with computers. To alleviate the danger of such exposure to radiation, causing harm to human eyesight, sight-protective screen lenses or screen nets are installed onto the screen of the computer monitor. To avoid the reflection of sunlight, screen protectors are also employed as a shade against sunlight casting directly on the screen.

Referring to FIG. 1, a conventional screen protector 1 is made of a shading plate 11, a sight-protective screen frame 12 or screen net. The shading plate 11 is integrally moulded and bent on both sides, extending downwards diagonally. Two cavities are disposed on the top piece of the shading plate to engage with the sight-protective screen frame 12 so as to secure it to the screen for protection against reflection of sunlight.

There are several drawbacks to a conventional screen protector. First, a conventional screen protector is fixed and set in a shape which can be suitably fastened only to sight-protective screen lenses or screen nets. Its structure is simple and its protective function limited. It can not efficiently prevent the invasion of sunlight. Secondly, when not in use, a conventional screen protector can not be folded up as a protector to the screen of a computer; and it also makes the mounting of a dustproof cover for a computer impossible.

SUMMARY OF THE INVENTION

The primary object of the present invention is to provide a foldable screen protector, having a fixing frame, a foldable top cover, and foldable left and right plates; the fixing frame can be adapted and secured to a screen of different types of computer monitors, even to that of a notebook computer, or to sight-protective screen lenses or screen nets, and by way of a torsion spring and protruded tracks to reduce the amount of friction, the foldable top cover and foldable left and right plates can be folded and unfolded easily. When not in use, the foldable top cover can be folded downwards and lodged to the locking cavities of the fixing frame.

Another object of the present invention is to provide protections to a computer screen against reflection of sunlight and invasion of dust.

BRIEF DESCRIPTION OF THE DRAWINGS

FIG. 2A is a diagram showing the detailed structure of the corner marked by A in FIG. 2;

DETAILED DESCRIPTION OF THE PREFERRED EMBODIMENT

Figure 1:
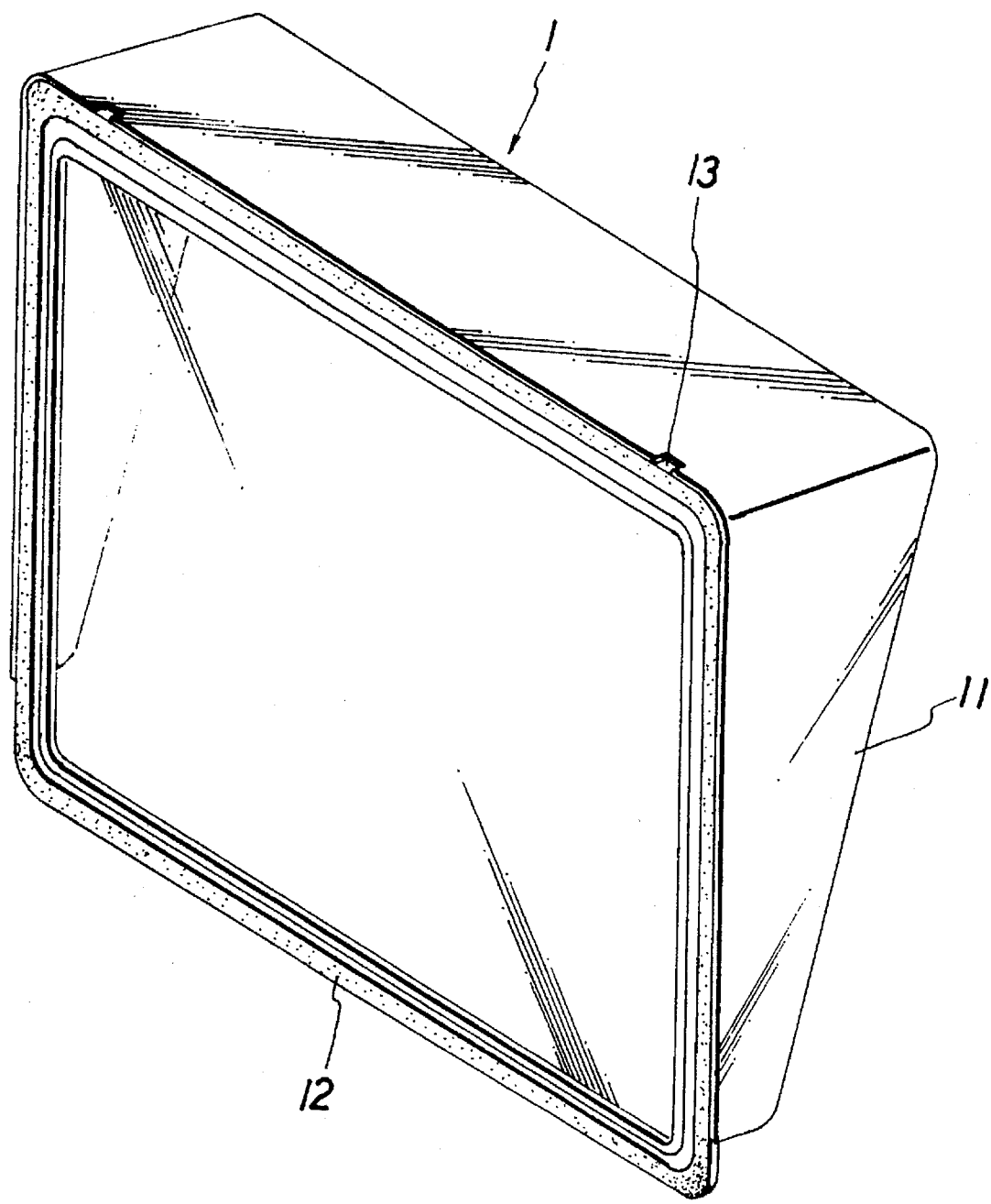
FIG. 1 is a perspective view of a conventional screen protector.

Referring to FIGS. 2, 2A, 3, 4, the present invention is an improvement of a foldable screen protector 2, comprising a fixing frame 21, a foldable top cover 22, and foldable left and right plates 23. The fixing frame 21 can be adapted and secured to the screen of different types of computer monitors, even to that of a notebook computer, or to sight-protective screen lenses or screen nets.

At each corner of the fixing frame 21 are disposed two bi-directional coupling hinges 211 and two one-directional coupling hinges 210, at the bottom side of the fixing frame 21 is disposed an indented opening 212 having two locking cavities 213 at both sides thereof, and at the top side of the fixing frame 21 is disposed a stop lump 214 to ban the unfolding movement of the foldable top cover 22.

The foldable top cover 22 is made mainly of an indented covering body with two protruded tracks 221 intersected across its surface. A spring mount 222 is lodged at the bottom side of the foldable top cover 22 to engage with a torsion spring 220 which, connected to the foldable top cover 22 at one end and to the fixing frame 21 at the other, helps the upwardly unfolding movement of the foldable top cover 22. Two protruded axles 223 are also disposed at the bottom side of the foldable top cover 22 to engage with the bi-directional coupling hinges 211 at the corner of the fixing frame 21, securing the foldable top cover 22 and the fixing frame 21 in place. At each of the right and left sides of the foldable top cover 22 is disposed an opening 224 which in folding can avoid the encounter of the foldable top cover 22 with the second torsion spring 230 at either of the foldable left and right plates 23.

At each of the top corners of the foldable top cover 22 is also disposed a vacancy 227 to refrain the foldable top cover 22 in folding from bumping into the one-directional coupling hinges 210 on the corner of the fixing frame 21. At the top side of the foldable top cover 22 is disposed a jutting block 225 as a handle and two jutting beads 226 to lodge with the locking cavities 213 of the fixing frame 21 when the foldable top cover 22 is folded up. In unfolding, the stop lump 214 of the top cover 22 works to ban the ultimate limit of an unfolding operation.

The foldable left and right plates 23 are made of two plates parallel with each other. There are two jutting axles 231 at the exterior of the bottom side of either of the foldable plates that are disposed to lodge with the one and bi-directional coupling hinges 210, 211 on the four corners of the fixing frame 21. Two jutting axles 232 at the interior of the bottom side of the foldable left and right plates hinge with the torsion springs 230 which, while linking to the foldable left and right foldable plates 23 at one end, are connected to the fixing frame at the other end. By means of the torsion spring 230 and the protruded tracks 221 on the foldable top cover 22 to reduce the amount of friction, the foldable left and right plates can be unfolded outwards till the tops of the foldable left and right plates 23 align with the lateral edges 228 of the foldable top cover 22, thus completing an unfolding operation.

An opening 233 is left also at the bottom corner of either of the foldable left and right plates 23 to avoid jarring of the plates with the bi-directional coupling hinges 211 at the top corners of the fixing frame 21 and the spring mount 222 on the foldable top cover 22.

Figure 2:
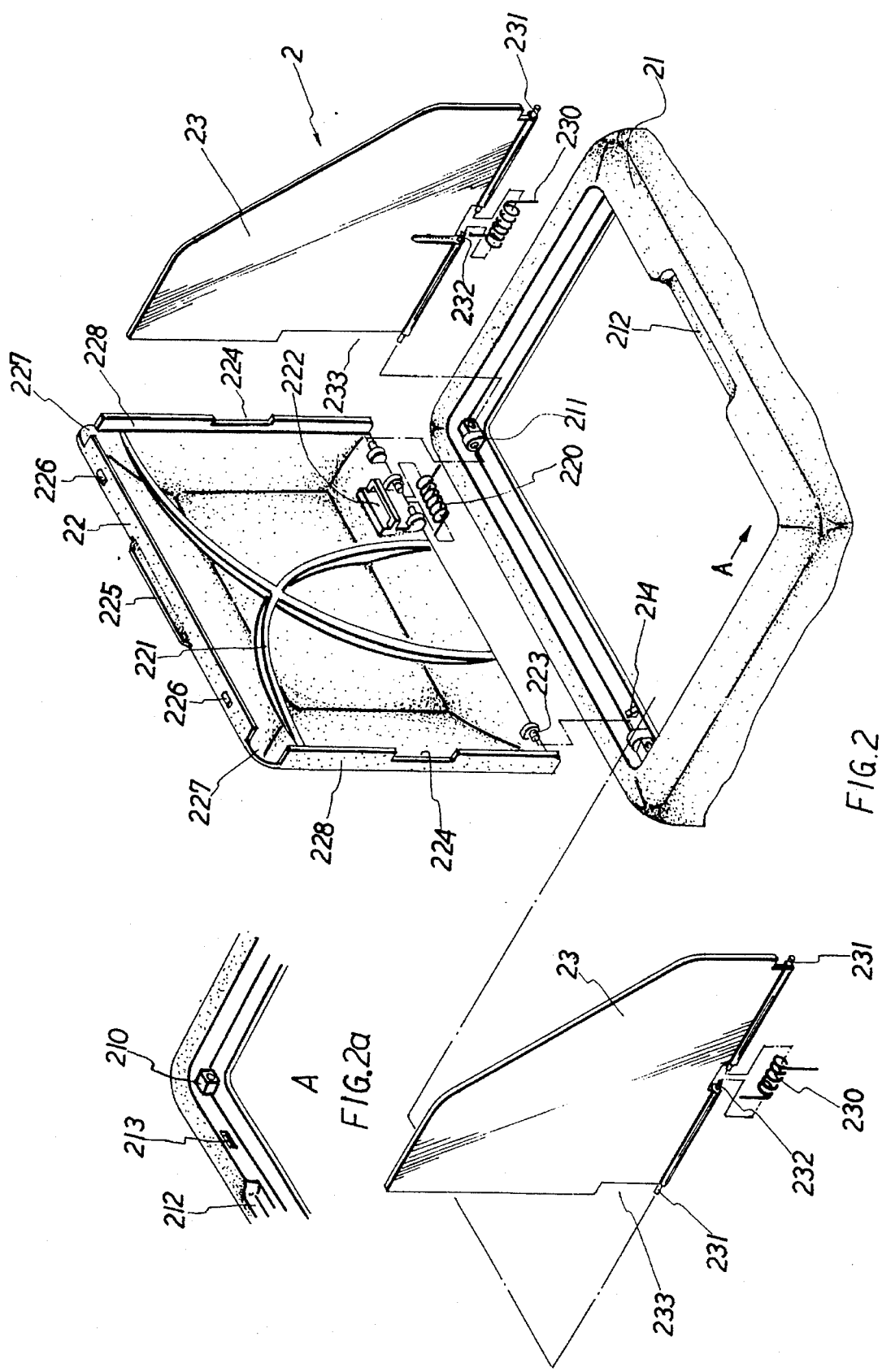
FIG. 2 is a diagram showing an exploded and partially enlarged perspective view of the present invention.
Figure 3:
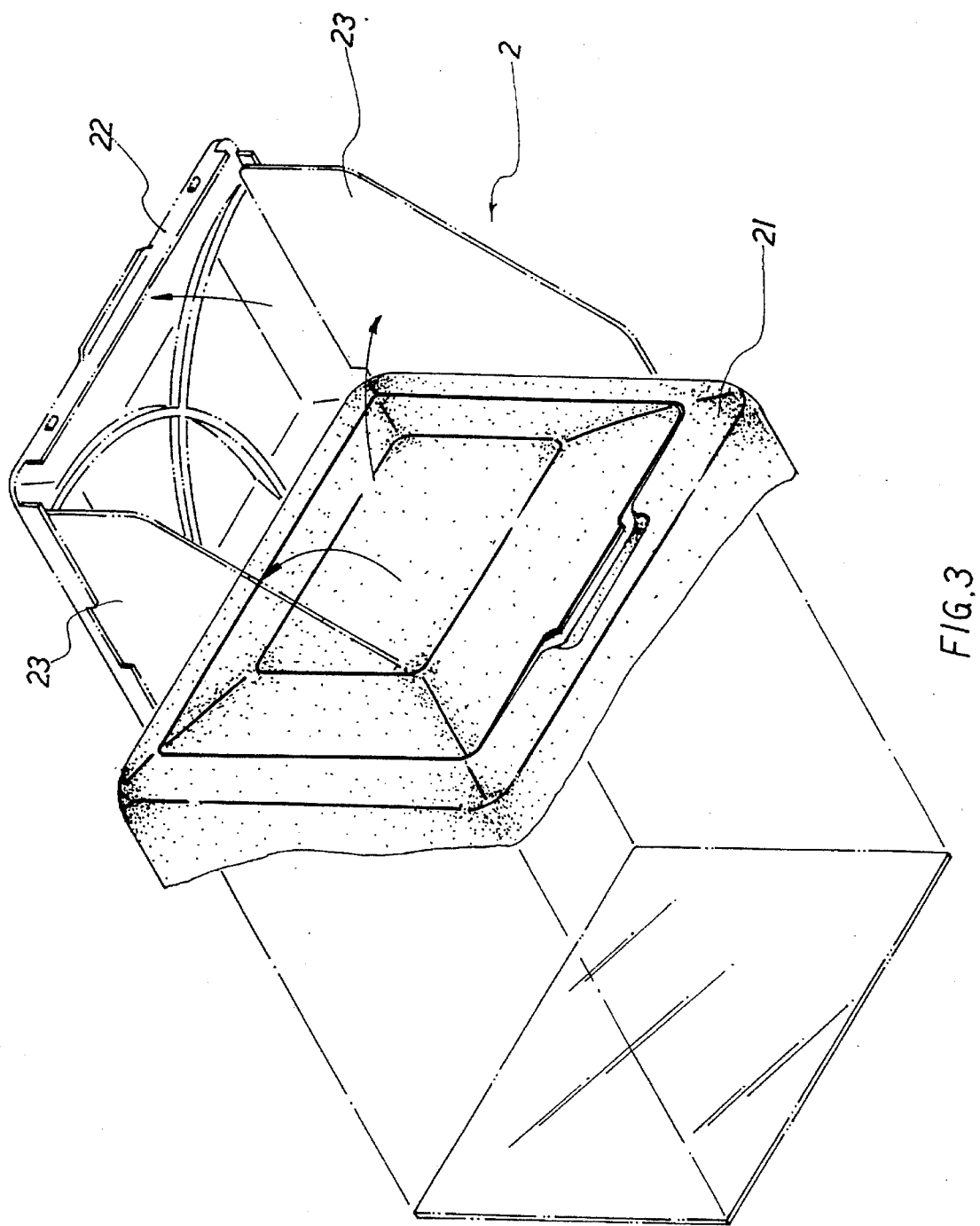
FIG. 3 is a diagram showing the present invention in operation.
Figure 4:
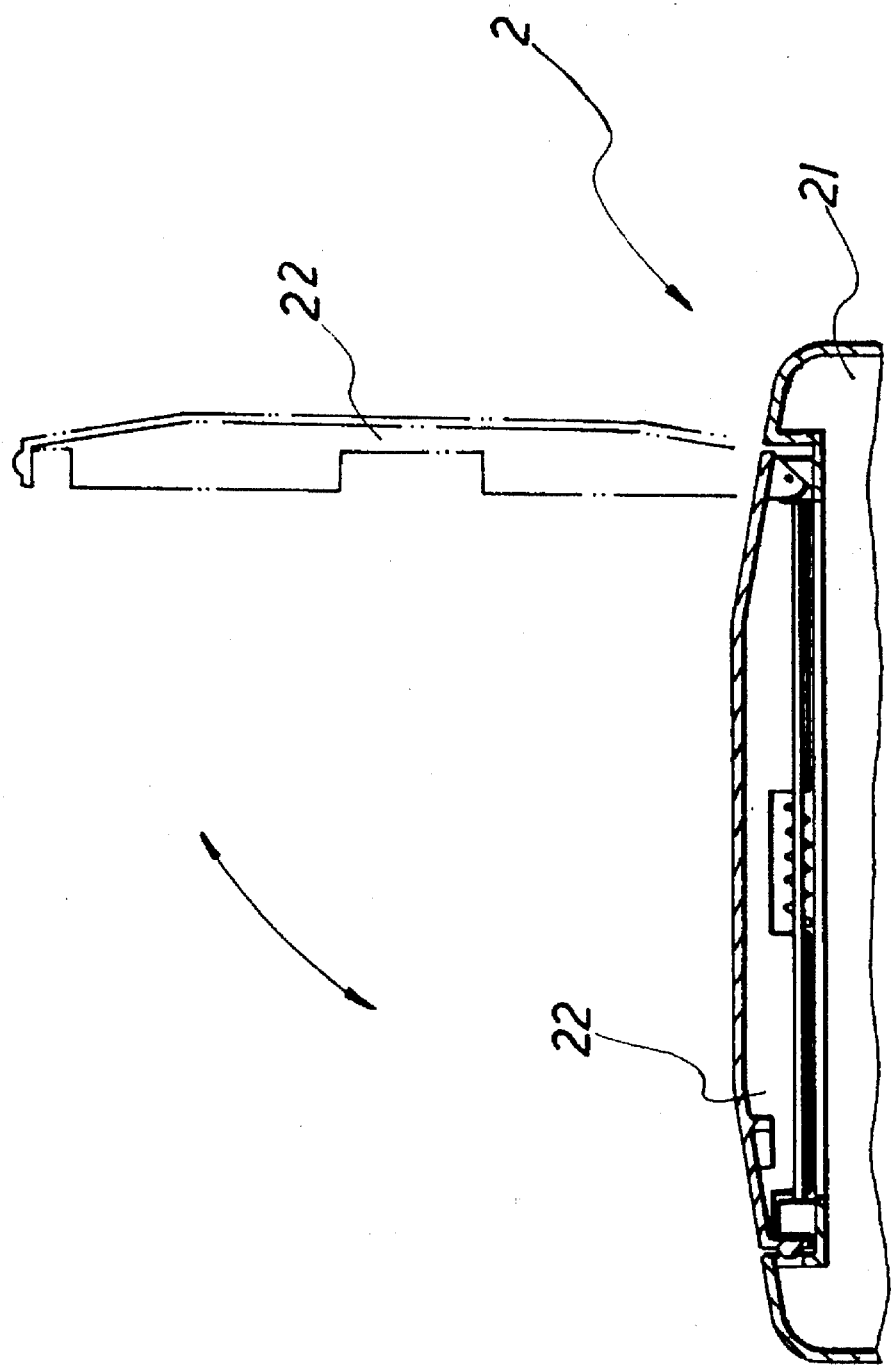
FIG. 4 is a sectional view showing the operational mode of the present invention.

As can be seen in FIGS. 2 and 4 and especially in FIG. 3, the fixing frame 21, as indicated by the ragged break line, may continue backward towards the rear of the computer monitor, distal the screen. (The monitor is generally indicated in FIG. 2 by alternating short and long dashed lines.) The fixing frame may be an integral part of the monitor cover; alternatively, it may be a separate piece attached by any conventional means.

What is claimed is:

1. A foldable screen protector for use on a computer monitor, comprising:

a fixing frame adapted for removably securing to the screen of a computer monitor or a notebook computer;

a foldable top cover having an indented covering body pivotally engaged with a top side of said fixing frame for covering said computer monitor;

foldable left and right plates parallel with each other, the plates being pivotally engaged with respective sides of said fixing frame for blocking sunlight or light from being cast directly onto the screen of a monitor;

said foldable left and right plates, when said protector is not in use, being foldably received in said fixing frame first and subsequently with said foldable top cover pivoted on top thereof;

wherein said fixing frame has two bi-directional coupling hinges disposed at two corners thereof and two one-directional coupling hinges disposed at the other two corners thereof so as to permit said foldable top cover and said two foldable left and right plates to be pivotally operated.

2. A foldable screen protector for use on a computer monitor, comprising:

a fixing frame adapted for removably securing to the screen of a computer monitor or a notebook computer:

a foldable top cover having an indented covering body pivotally engaged with a top side of said fixing frame for covering said computer monitor;

foldable left and right plates, parallel with each other, the plates being pivotally engaged with respective sides of said fixing frame for blocking sunlight or light from being cast directly onto the screen of a monitor;

said foldable left and right plates, when said protector is not in use, being foldably received in said fixing frame first and subsequently with said foldable top cover pivoted on top thereof;

wherein said foldable top cover has a pair of protruded tracks intersecting with each other on one face thereof so as to permit said left and right plates to be easily pivoted to extend or retract.

* * * * *